(12) United States Patent
Riotte

(10) Patent No.: US 10,207,313 B2
(45) Date of Patent: Feb. 19, 2019

(54) GRIPPING DEVICE FOR MECHANICAL FASTENERS

(71) Applicant: KUKA Systems Aerospace, Le Haillan (FR)

(72) Inventor: Patrice Riotte, Merignac (FR)

(73) Assignee: KUKA Systems Aerospace, Le Haillan (FR)

( * ) Notice: Subject to any disclaimer, the term of this patent is extended or adjusted under 35 U.S.C. 154(b) by 0 days.

(21) Appl. No.: 15/535,802

(22) PCT Filed: Dec. 17, 2015

(86) PCT No.: PCT/EP2015/080260
§ 371 (c)(1),
(2) Date: Jun. 14, 2017

(87) PCT Pub. No.: WO2016/102306
PCT Pub. Date: Jun. 30, 2016

(65) Prior Publication Data
US 2017/0348761 A1    Dec. 7, 2017

(30) Foreign Application Priority Data

Dec. 22, 2014   (EP) .................................... 14307139

(51) Int. Cl.
   *B21J 15/32*    (2006.01)
   *B25J 15/00*    (2006.01)
   *B21J 15/14*    (2006.01)
(52) U.S. Cl.
   CPC ............. *B21J 15/32* (2013.01); *B21J 15/142* (2013.01); *B25J 15/0019* (2013.01);
   (Continued)

(58) Field of Classification Search
   CPC ..................... B25J 15/0004; B25J 15/0023; B25J 15/0028; B25J 15/0033; B25J 15/0042;
   (Continued)

(56) References Cited

U.S. PATENT DOCUMENTS 3,734,556 A * 5/1973 Misawa ............... B25J 15/0206
                                                294/206
3,739,923 A * 6/1973 Totsuka .................... B25J 9/10
                                                414/730

(Continued)

FOREIGN PATENT DOCUMENTS

CN         2767078 Y      3/2006
CN       104175261 A     12/2014
   (Continued)

OTHER PUBLICATIONS

European Patent Office; Search Report in European Patent Application No. 14307139 dated Aug. 4, 2015; 2 pages.
(Continued)

*Primary Examiner* — Dean J Kramer
(74) *Attorney, Agent, or Firm* — Dorton & Willis, LLP

(57) ABSTRACT

A gripping device for mechanical fasteners, such as rivets, screws, bolts, and similar fasteners, and a robot effector employing such a device. The device includes a housing and a pair of jaws arranged on a holder. The pair of jaws is adapted to grip a mechanical fastener therebetween. The holder is rotatable inside of the housing and the jaws allow a self-centering of a gripped mechanical fastener.

12 Claims, 6 Drawing Sheets

(52) U.S. Cl.
CPC ....... *B25J 15/0028* (2013.01); *B25J 15/0033* (2013.01); *B25J 15/0042* (2013.01); *G05B 2219/45088* (2013.01)

(58) Field of Classification Search
CPC .. B25J 15/0206; B25J 15/022; B25J 15/0226; B21J 15/32; G05B 2219/45088
USPC ................................ 294/198, 201, 202, 115
See application file for complete search history.

(56) References Cited

U.S. PATENT DOCUMENTS

| | | | | |
|---|---|---|---|---|
| 4,697,838 | A * | 10/1987 | Hartman | ................ B25J 9/1015 294/115 |
| 4,784,422 | A * | 11/1988 | Jones | ................... B25J 15/0028 294/106 |
| 5,036,576 | A * | 8/1991 | Gast | ....................... B21J 15/105 227/1 |
| 5,234,244 | A * | 8/1993 | Kim | ..................... B25J 15/0206 294/115 |
| 5,639,136 | A * | 6/1997 | Rosengren | ............... B25J 9/146 294/115 |
| 6,067,839 | A * | 5/2000 | Xie | ...................... B23K 20/129 228/114.5 |
| 6,253,448 | B1 * | 7/2001 | Zieve | ....................... B21J 15/32 227/119 |
| 2005/0178816 | A1 | 8/2005 | Stevenson et al. | |
| 2011/0146456 | A1 * | 6/2011 | Hain | ....................... B23K 9/201 81/55 |
| 2013/0212883 | A1 * | 8/2013 | Soto Martinez | ...... B23P 19/005 29/897.2 |
| 2014/0030032 | A1 * | 1/2014 | Kuhn | ....................... B21J 15/32 406/196 |

FOREIGN PATENT DOCUMENTS

| | | |
|---|---|---|
| DE | 202008014886 U1 | 4/2010 |
| EP | 2275225 A1 | 1/2011 |
| JP | H0890476 A | 4/1996 |

OTHER PUBLICATIONS

European Patent Office; Written Opinion in International Patent Application No. PCT/EP2015/080260 dated Jun. 22, 2017; 6 pages.
Chinese Patent Office; Examination Report in Chinese Patent Application No. 201580070279.3 dated Aug. 30, 2018; 5 pages.
Chinese Patent Office; Search Report in Chinese Patent Application No. 201580070279.3 dated Aug. 22, 2018; 2 pages.

* cited by examiner

GRIPPING DEVICE FOR MECHANICAL FASTENERS

CROSS-REFERENCE

This application is a national phase application under 35 U.S.C. § 371 of International Patent Application No. PCT/EP2015/080260, filed Dec. 17, 2015 (pending), which claims the benefit of European Patent Application No. 14307139.7 filed Dec. 22, 2014, the disclosures of which are incorporated by reference herein in their entirety.

TECHNICAL FIELD

The present invention relates to a gripping device for mechanical fasteners, such as rivets, screws, bolts and similar and a robot effector and a robot being provided with such a device.

BACKGROUND

In many industrial manufacturing processes, mechanical fasteners, such as rivets, screws, bolts and similar are used for joining or fixing two or more objects together. The installation of such mechanical fasteners is often automated by machines or robots that can install mechanical fasteners much quicker and with a higher precision than a human being. For such automated systems it is necessary to feed the mechanical fasteners quickly and reliable to the actual installation mechanisms. This can be done by hand, whereas in most instances it is preferred to use appropriate automated feeding mechanisms. Automated installation processes for mechanical fasteners therefore often require that the fastener to be installed is picked up from a first position, such as from a feeding mechanism or from a supply magazine or similar, and is moved to another location for further processing or installation. Therefore, such gripping devices should not only be reliable and accurate, but it is often desired that the mechanical fasteners are provided in a certain orientation.

From prior art document DE 20 2008 014 886 U1 a robot effector is known for installing mechanical fasteners, namely in particular rivets. The robot effector is provided with a frame that is attached to the hand of an industrial robot. On the frame an installation mechanism is arranged that can be provided with a supply magazine for different mechanical fasteners.

In view of the above, it is an object of the present invention to provide an improved gripping device for mechanical fasteners that offers a secure, reliable and precise gripping of such mechanical fasteners and which preferably also offers additional flexibility in the orientation and processing of a gripped mechanical fastener. It is a further object of the invention to provide such a gripping device in connection with a robot effector for installing mechanical fasteners, to reliably and precisely grip and move mechanical fasteners from one processing station of the effector to another.

These and other objects which become apparent when reading the following description are solved by a gripping device as discussed.

SUMMARY

According to the invention, a gripping device for mechanical fasteners, such as rivets, screws, bolts and similar is provided, which comprises a housing and a pair of jaws (i.e. at least two jaws, of which at least one is movable relative to the other) adapted to grip a mechanical faster. The pair of jaws is arranged on a holder and the holder in turn is arranged rotatable inside of the housing. Thereby, it is possible to rotate a once gripped mechanical fastener, preferably by 360°, in order to bring the fastener into a desired orientation or for example to apply a suitable additive, such as glue or sealing material, onto the gripped fastener, by rotating the fastener adjacent to a suitable supply mechanism of such additives. The jaws are further shaped to allow a self-centering of a gripped mechanical fastener. Such a self-centering can for example and preferably be achieved by providing at least one of the jaws with a concave gripping surface, and in particular a V- or U-shaped gripping surface. Thereby, once the jaws grip a fastener, for example out from a supply magazine, the gripped fastener is automatically moved to the deepest location of the concave gripping surface, whereby it can be automatically centered in a desired position or orientation. Preferably, both jaws move relative to each and are mechanically coupled such that both always move for the same distance. This has the advantageous effect that a gripped fastener is not only centered in relation to one axis, as e.g. the horizontal axis, but also in relation to another axis, that is preferably perpendicular to the one axis. Thereby, it is possible to align the fasteners such that the center or middle axis of each fastener is always at a predefined and desired position, irrespective of the diameter of the fastener.

Generally preferred, each jaw is arranged on a free end of a lever arm, which in turn is supported pivotably by the holder. The jaw can be an integral part of the lever arm but it is preferably likewise mounted pivotable to the end of the lever arm, such that upon movement of the lever arm the jaw can be guided in e.g. a linear and straight direction. The lever arms are preferably supported such that during a pivot movement of the lever arms, the free ends of the lever arms move towards and/or away from each other. Since the jaws are provided on the free ends, this leads to a gripping movement of the jaws.

Preferably, the actuating of the jaws is achieved by means of an actuating piston that is arranged to be linearly moveable with respect to the jaws. To this end, preferably, at least one of the lever arms comprises an actuating projection that is offset from the pivot axis of the lever and the actuating piston on its linear movement comes into contact and interacts with said actuating projection, whereby the lever arm is rotated around its pivot axis. The actuating piston is preferably actuated pneumatically.

Preferably, the gripping device is part of a robot effector for installing mechanical fasteners, such as rivets, screws, bolts and similar. To this end, the device is mounted on a frame of the robot effector and preferably in such a way that the device is moveable. Thereby, it is for example possible to move the device from a feeder mechanism or a supply magazine of mechanical fasters to another processing station of the effector, such as an installation mechanism. The gripping device grips e.g. one fastener from the feeding mechanism or supply magazine and moves the gripped fastener to the installation mechanism, where it is put by the gripping device in a suitable reception member. The installation mechanism is preferably part of the same larger robot effector. The installation mechanism then installs the provided fastener as desired. In order to achieve a high flexibility, it is preferred that in such an arrangement the gripping device is arranged linearly moveable on the frame as well as rotatably moveable.

Preferably, the holder is mounted inside of the housing and can be rotated relative to the housing by means of a tooth wheel, that is for example driven by corresponding drive wheels. The housing does comprise a bearing structure to receive the holder rotatably therein. When the tooth wheel is rotated, the holder rotates with the tooth wheel, whereby also the jaws are rotated, since they are arranged on the holder. Due to this rotation, it is possible to rotate a gripped fastener, as for example a rivet. Thereby, it is e.g. possible to move a gripped fastener for example to a glue or sealant supply station and to rotate the gripped fastener at the supply station, so that it can be fully covered by for example glue or sealant or similar. Each jaw is preferably provided at a respective free end of a pair of lever arms. The lever arms are supported pivotably in or at the holder by means of pivot pins that are arranged in bearings provided in the holder. When the lever arms are pivoted, the jaws are opened, respectively closed depending on the direction of rotation. Since the lever arms have both a defined pivoting axis, the pivot movement of the lever arms is structurally preset or predetermined. The actuating of the lever arms, i.e. the movement of the jaws, is effected preferably by means of an actuating piston. The actuating piston runs preferably through the holder and is arranged linearly moveable therein in a direction that is perpendicular to the rotation direction of the holder. It comprises an interacting means, e.g. in form of a piston pin, that interacts with actuating projections provided on the lever arms. Each actuating projection is offset from the pivot axis of its lever and when the actuating piston is moved back and forth linearly inside of the holder, the interacting means engages the actuating projections, whereby the lever arms 30 and 31 are pivoted around the respective pivot pins. Thus, the movement of the two lever arms, and thereby of the two jaws, is mechanically coupled, so that the amount of rotation of each lever arm for a given movement of the actuating piston is precisely preset. This allows a predetermined and exact relative movement of the two levers (and thus the two jaws) relative to each other, so that when the jaws are closed they center any gripped fastener therebetween in a reliable and exactly defined position.

BRIEF DESCRIPTION OF THE DRAWINGS

In the following, the invention is described exemplarily with reference to the enclosed figures, in which:

FIGS. 5a and b show a front view of the jaws of the gripping device, and.

DETAILED DESCRIPTION

Figure 1A:
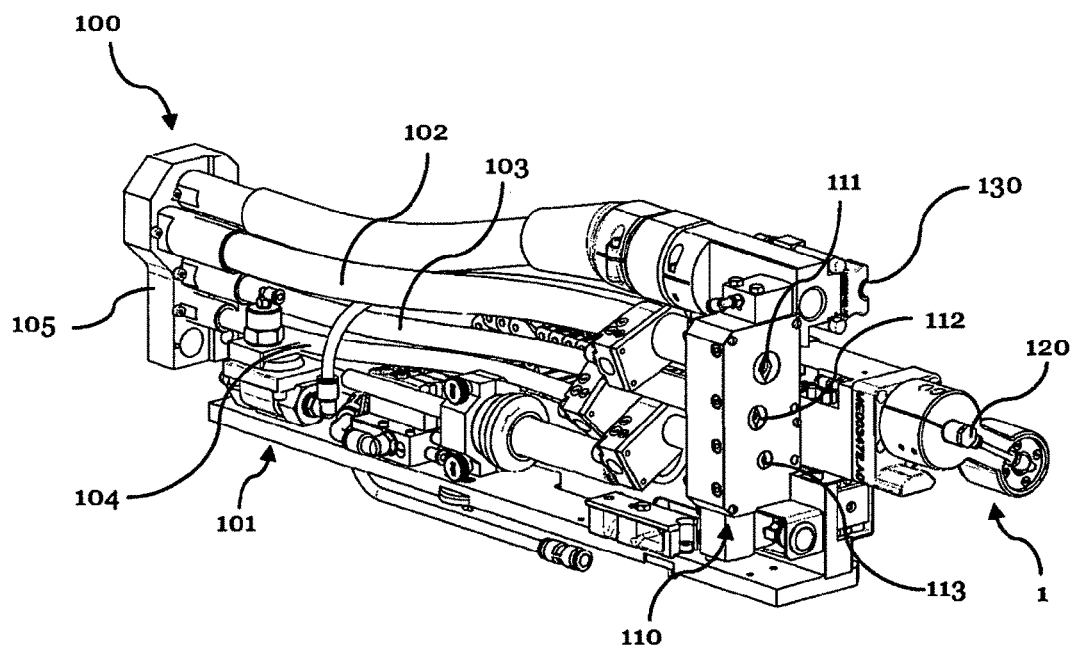
FIGS. 1a and 1b show schematic, 3-dimensional drawings of a robot effector comprising a gripping device in accordance with the invention.

In FIG. 1a a robot effector 100 for installing mechanical fasteners, in the shown case of rivets, is shown in a 3-dimensional schematic view. The effector 100 forms part of a larger end effector (not shown) for an industrial robot, which larger end effector can e.g. comprises further installation tools, measurement tools etc. The robot effector comprises a frame 101, that supports a number of work stations necessary for an automatic installation of rivets. The frame 101 comprises a fixing plate 105, which is in use attached to e.g. the larger end effector or the hand of an industrial robot, similar as shown in the figures of the DE 20 2008 014886 U1 discussed above. The frame 101 carries a feeder mechanism 110 for feeding mechanical fasteners. In the shown configuration, three feed lines 102, 103, 104 are provided, through which rivets of different sizes can be transported from a magazine by means of air to the feeder mechanism 110. The feeder mechanism 110 comprises three outlets 111, 112, 113 to provide/present the differently sized rivets. The outlets hold and present the rivets in a desired orientation, such that they can be grabbed by the gripping device 1. The gripping device 1 is likewise mounted on frame 101 and arranged thereon, such that it is rotatable around an axis of rotation 120. Thereby, the gripping device 1 can be rotated to different stations of the effector 100, such as for example to the three different outlets of the feeder mechanism 110. To this end, the three outlets 111, 112 and 113 are arranged on the radius that the gripping device 100 follows, when rotating around axis 120.

In the shown embodiment, additionally a supply station 130 for additives is provided. The supply station 130 can for example provide glue or sealant fluid to the rivets grabbed by gripping device 1. In practice, the gripping device 1 first rotates until its jaws are aligned with one of the outlets. There, the gripping device is moved linearly towards the outlet, until the jaws of the gripping device can grip one of the supplied rivets. Once gripped, the gripping device 1 is again moved linearly away from the feeder mechanism 110 and then rotated, until the gripped rivet is at the supply station 130. As it will be explained in more detail below, at the supply station the gripped rivet is for example provided with a sealant material. Afterwards, the gripping device 1 is again rotated into the position shown in FIG. 1a, where the rivet is for example provided to further installation tools that may be provided on the same larger end effector as mentioned above.

Figure 1B:
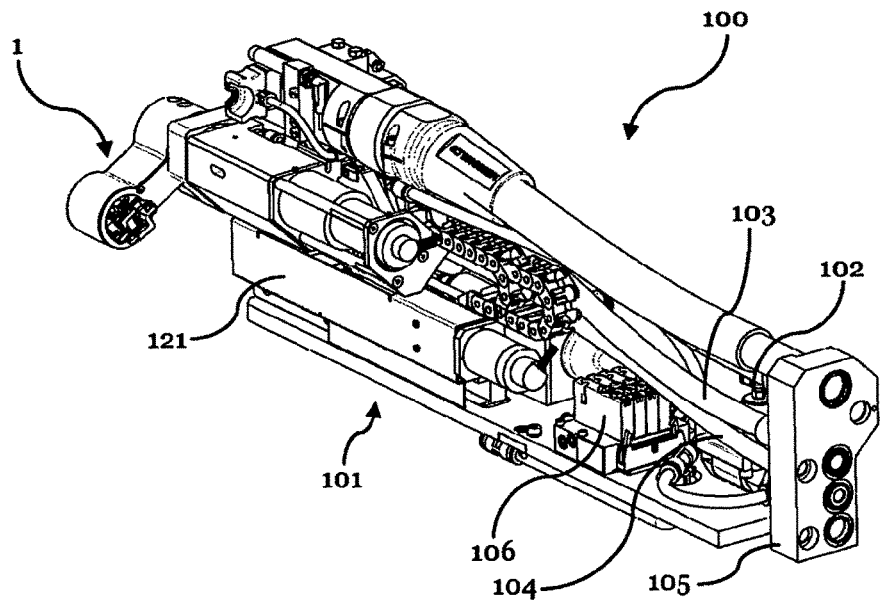

FIG. 1b shows the device of FIG. 1a in a 180° rotated view. The robot effector 100 additionally comprises a slide 121 for linear movement of the gripping device 1. Thus, the slide 121 can move the device 1 back and forth, such as for example towards the outlets of the feeder mechanism 110 and away therefrom. Reference number 106 denotes electronic controllers of the effector 100.

Figure 2:
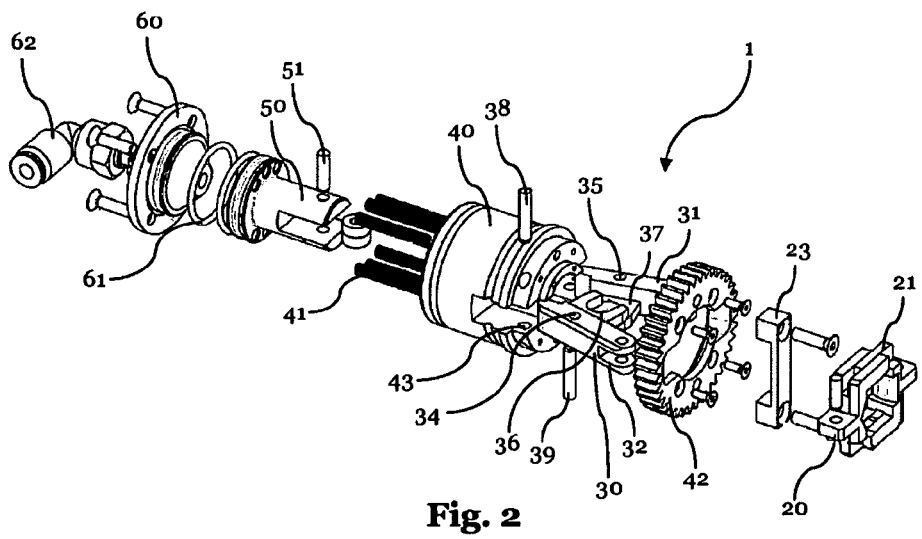
FIG. 2 shows a gripping device in accordance with the invention in an exploded, 3-dimensional view.
Figure 3:
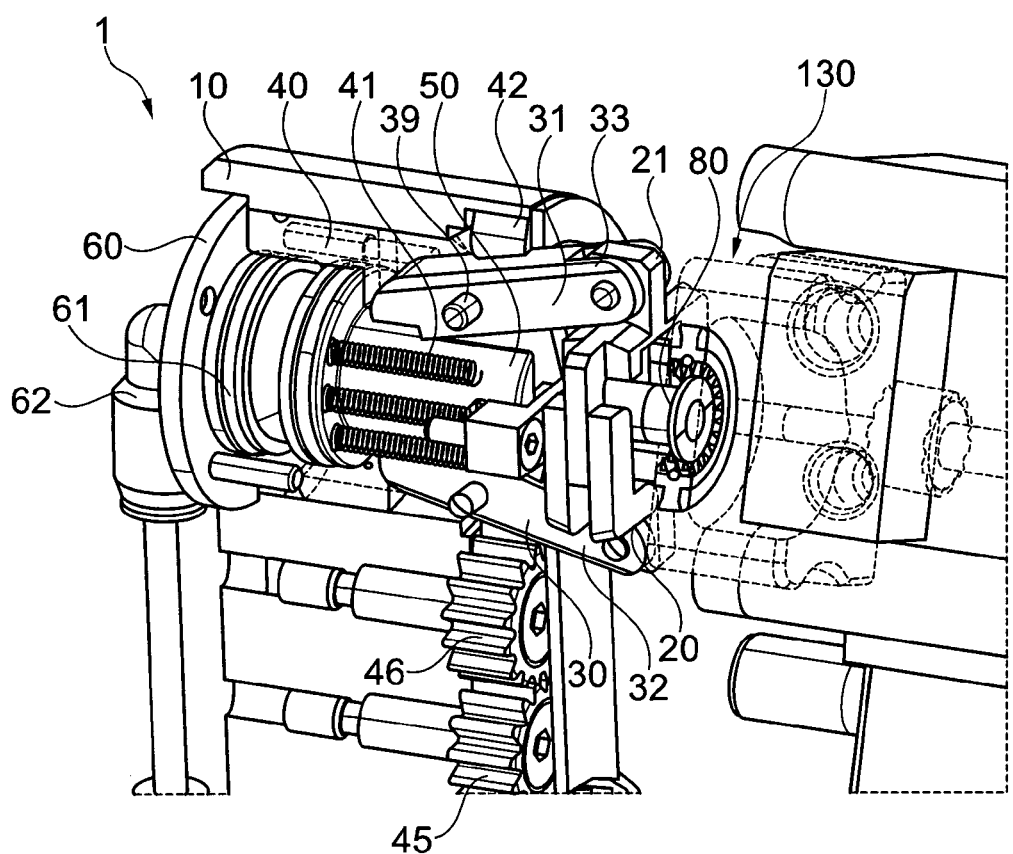
FIG. 3 shows the device of FIG. 2 in a schematic, partially cut 3-dimensional view in assembled condition.

FIG. 2 shows a schematic, 3-dimensional exploded view of the gripping device 1, however, without the housing, to allow a view of the interior parts thereof. The housing 10 is shown in the partially cut 3-dimensional schematic view of FIG. 3, wherein the device of FIG. 2 is shown in assembled condition. Turning back to FIG. 2, one can see a holder 40, having a cylindrical, hollow shape. The holder is arranged rotatable inside of the housing 10, as will be explained below with reference to FIG. 3. Further, the device comprises a pair of jaws 20, 21, that are mounted to the holder 40 via a corresponding pair of lever arms 30 and 31. Each lever arm comprises a free end 32, 33 onto which the jaws 20, 21 are pivotably arranged. Further, a tooth wheel 42 is provided, that is fixedly attached to the holder 40 by means of screws. The holder 40 is rotated via the tooth wheel 42, which in turn is actuated by means of drive wheels 45, 46, which engage the tooth wheel 42. The drive wheels are shown in FIG. 3. Still further, a stop member 23 is provided, which serves the purpose to prevent that gripped fasteners do extend to the actuating portion of the lever arms, so that the movement thereof is not hindered by any gripped fasteners.

Turning back to the lever arms, each lever arm 30, 31 is supported pivotably by the holder 40 via pivot pins 38, 39 that are arranged in bearings 43. The skilled person will recognize from the illustration of FIG. 2, that the pivot axes of the two lever arms are parallel but are not identical but rather offset at a certain distance from each other. Thus, the two pivot axes of lever arms 30 and 31 define a plane that is perpendicular to the axis of rotation of holder 40. The actuating of the lever arms, i.e. the movement of jaws 20 and 21, is effected by means of an actuating piston 50. The actuating piston 50 runs through the hollow holder 40 and is arranged linearly moveable therein. It comprises a piston pin 51, which interacts with actuating projections 36 and 37 provided on the lever arms. Each actuating projection is offset from the pivot axis of its lever and when the actuating piston 50 is moved back and forth linearly inside of holder 40, the piston pin 51 engages the actuating projections 36, 37, whereby the lever arms 30 and 31 are pivoted around the respective pivot pins 38, 39.

The device comprises further a cover 60 and a pneumatic connector 62, by means of which pressurized air is supplied in the space behind actuating piston 50, i.e. in the space between cover 60 and actuating piston 50. Thereby, the actuating piston 50 can be moved to the right in FIG. 2. Sealing rings 61 are provided to prevent pressurized air from escaping the housing. A number of return springs 41 push the piston back, once the pressurized air supply is switched off.

In FIG. 3, the device shown in exploded view in FIG. 2 is shown in assembled condition. One can see how the holder 40 is mounted inside of housing 10. The holder 40 is arranged rotatable in housing 10, by means of the tooth wheel 42, which is driven by drive wheels 45 and 46. When the holder 40 is rotated, also the levers 30, 31 and thereby the jaws 20 and 21 are rotated, whereas the cover 60 remains fixed to housing 10. Due to this rotation, it is possible to rotate a gripped fastener, as for example a rivet 80, as shown in FIG. 3. Thereby, it is possible to move a gripped rivet to the supply station 130 and to rotate rivet 80 at the supply station 130, so that it can be fully covered by for example glue or sealant or similar. The actuating piston 50 can only be moved in one direction by means of the pressurized air. The return stroke of piston 50 is effected by means of return springs 41. The return springs 41 hereby are supported by a baseplate of the piston 50 and directly or indirectly by the holder 40. As FIG. 3 shows a sectional view, also the holder 40 and the tooth wheel 42 are shown in section and therefore, the springs 41 in FIG. 3 have with one side no connection to a part of the gripping device 1. Directly or indirectly can mean, that the return springs 41 can be supported by a surface of the holder 40 itself or by another element, that is connected/to or with the holder 40, for example the tooth wheel 42, which is screwed to the holder 40. Furthermore, in FIGS. 2 and 3 six return springs 41 are shown. However, it is also possible to use more or less return springs 41, especially, two, four, six or eight return springs 41.

In FIG. 3, one can further see, how jaws 20 and 21 are mounted pivotable to the free ends 32 respectively 33 of the lever arms.

Figure 4A:
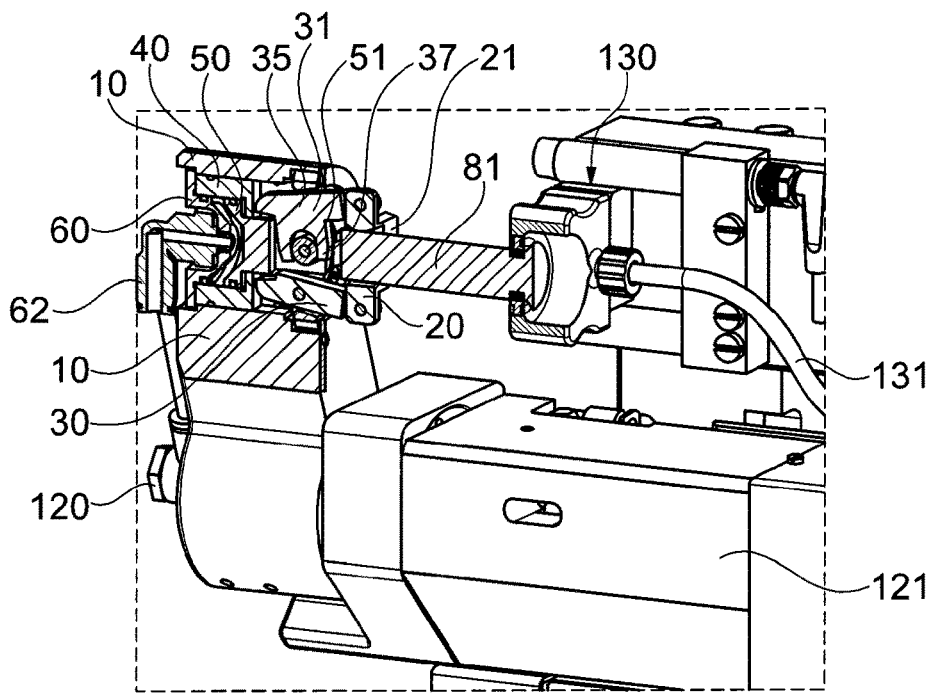
FIGS. 4a-4c show different cut-views of the device of FIGS. 2 and 3.

FIG. 4a shows a partially cut 3-dimensional view, similar to that of FIG. 3, however with a much larger rivet 81 gripped between the jaws 20 and 21. As one can take from the cut views of FIGS. 4a and b, the actuating piston 50 can be moved forward, i.e. to the right in the figures when pressurized air is supplied via connector 62 into the space between cover 60 and piston 50. When piston 50 moves to the right in FIG. 4a, the piston pin 51 interacts with the actuating projection 37 (and actuating projection 36, which is however not visible in FIGS. 4a and b), such that lever arm 31 is rotated anticlockwise around its pivot axis 35. In the shown orientation of FIG. 4a, the lever arm 30 is accordingly rotated clockwise. This has the effect that the jaws 20 and 21 open. A closing of jaws 20 and 21 is accordingly achieved by means of the return springs 41. However, the skilled person will recognize, that depending on the chosen geometry this mechanism could likewise be inversed, such that the jaws 20, 21 close upon supplying pressurized air, and that they open due to the return springs 41. The number of return springs 41 hereby depends on the force that has to or shall be applied on the fasteners and/or jaws 20 and 21 for closing or opening. In the detailed view of FIG. 4a, one can further see where the axis of rotation 120 of the gripping device 130 is in respect to the robot effector 100. Further, one can see a supply line 131 for supplying an additive, such as a sealant to the supply station 130 in order to provide the rivet 81 with a suitable additive. The gripping device 1 is arranged linearly movable parallel to the axis of rotation 120 of gripping device 1 by means of slide 121, so that for example the rivet 81 can be moved back and forth in station 130, in order to provide a larger surface area of rivet 81 with the desired additive.

Figure 4B:
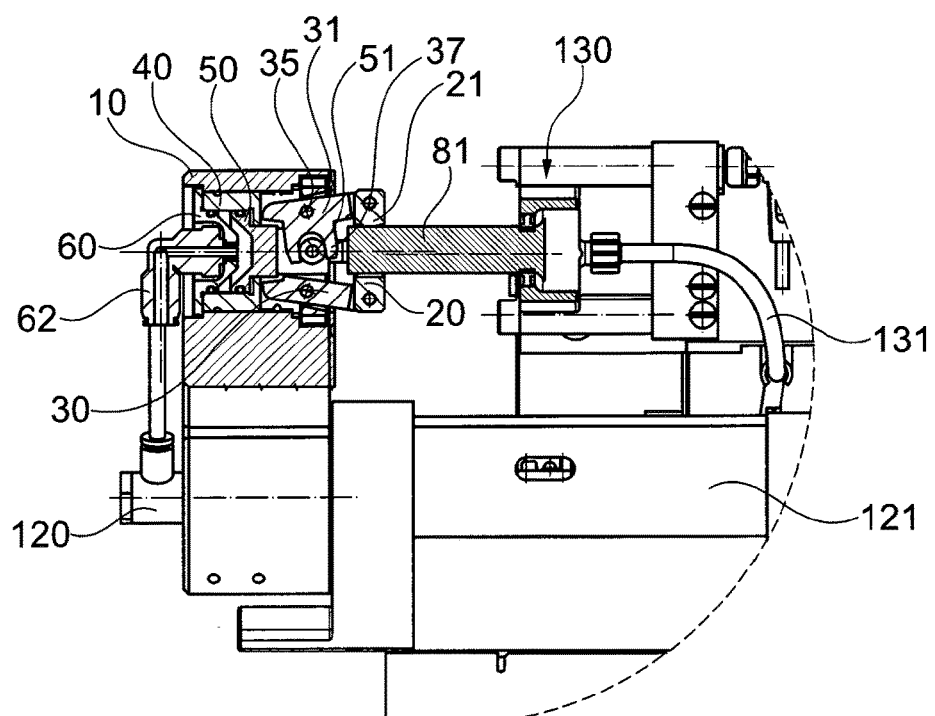

FIG. 4b shows basically the same elements as FIG. 4a, however, in a cut side view.

Figure 4C:
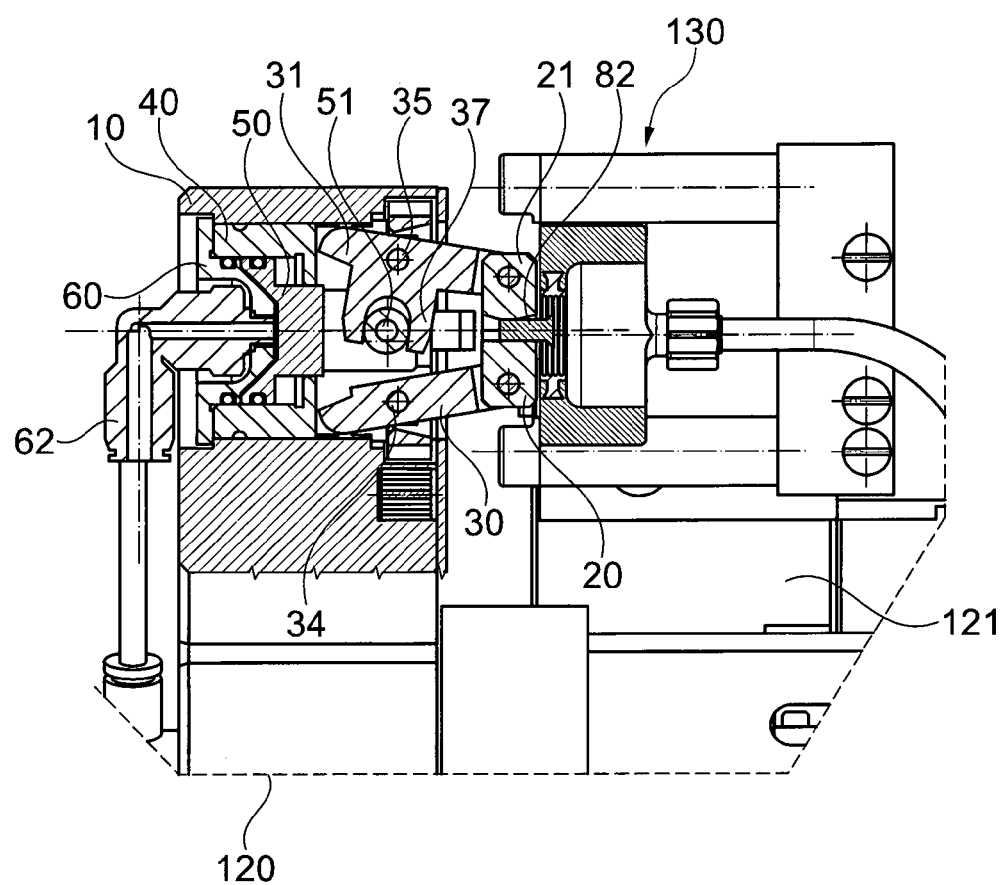

FIG. 4c shows the same arrangement as FIG. 4b, however with a much smaller rivet 82 gripped by jaws 20 and 21. One can see that piston 50 is moved back almost into contact with the inner surface of cap 60 by means of the return springs 41. Upon pressurizing, the piston 50 will move to the right in FIG. 4c, whereby the upper lever 31 is rotated anticlockwise and the lower lever 30 clockwise so that the jaws opened. The skilled person will understand that the expressions left, right, upper, clockwise etc. used in this description are only with reference to the orientation shown in the figures and that in practice the whole effector can be arranged in any spatial orientation as it is attached to an industrial robot.

Figure 5A:
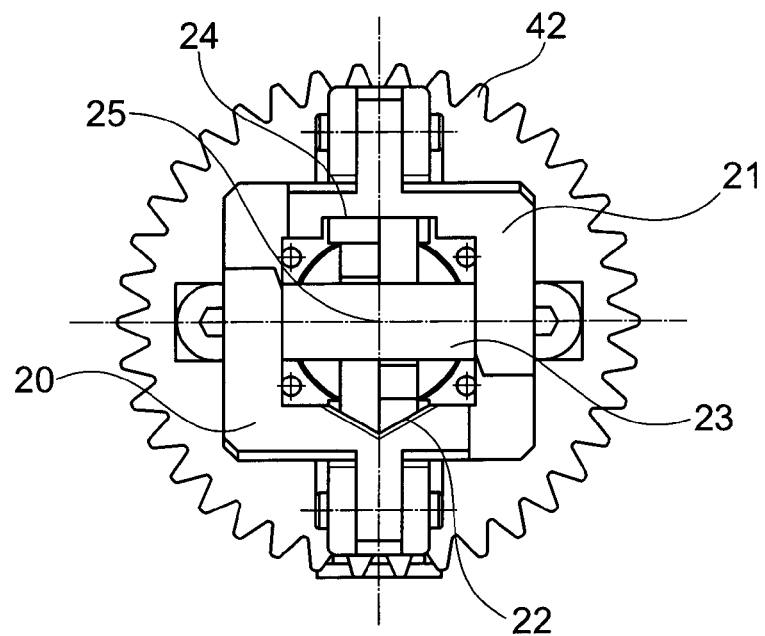
Figure 5B:
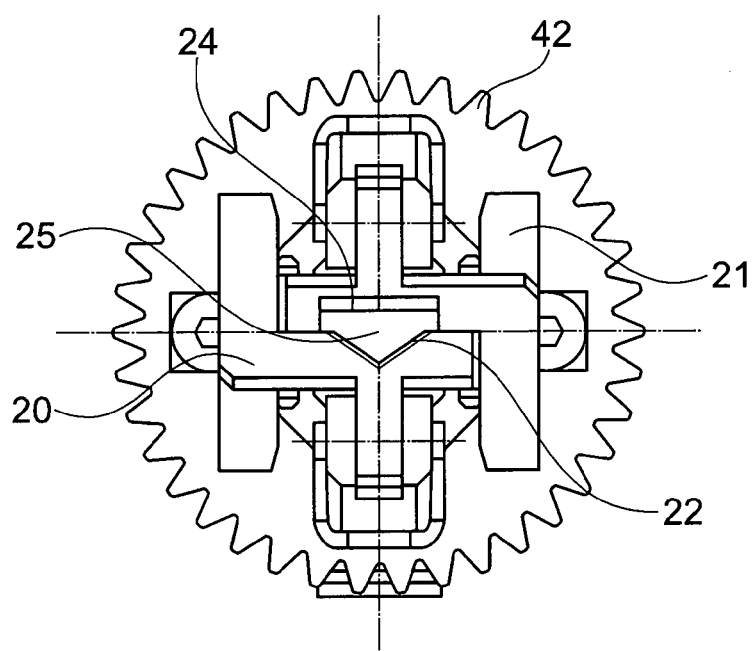

FIGS. 5a and b show a frontal detail view of jaws 20 and 21. One can see how the jaws are arranged with respect to the tooth wheel 42, and that the jaws will rotate together with the tooth wheel 42 and the holder 40. The jaw 20 comprises a particular gripping surface, namely a concave respectively V-shaped gripping surface 22 to provide a self-centering feature. The gripping surface of jaw 21 in turn is straight, i.e. jaw 21 has a straight gripping surface 24. However, alternatively, also jaw 21 could be provided with a similar concave gripping surface. The skilled person will recognize that when a rivet is inserted between the two jaws, and the jaws are closed, the V-shaped gripping surface 22 will automatically center the rivet. Further, due to the symmetrical arrangement of the levers that move the jaws, both jaws 20 and 21 will always close simultaneously and to the same extent, so that any rivet will not only be centered in a horizontal direction, but also in a vertical direction, i.e. any cylindrical mechanical fastener when gripped with the inventive gripping device will automatically and advantageously exactly align in center 25 of jaws 20 and 21.

Figure 6:
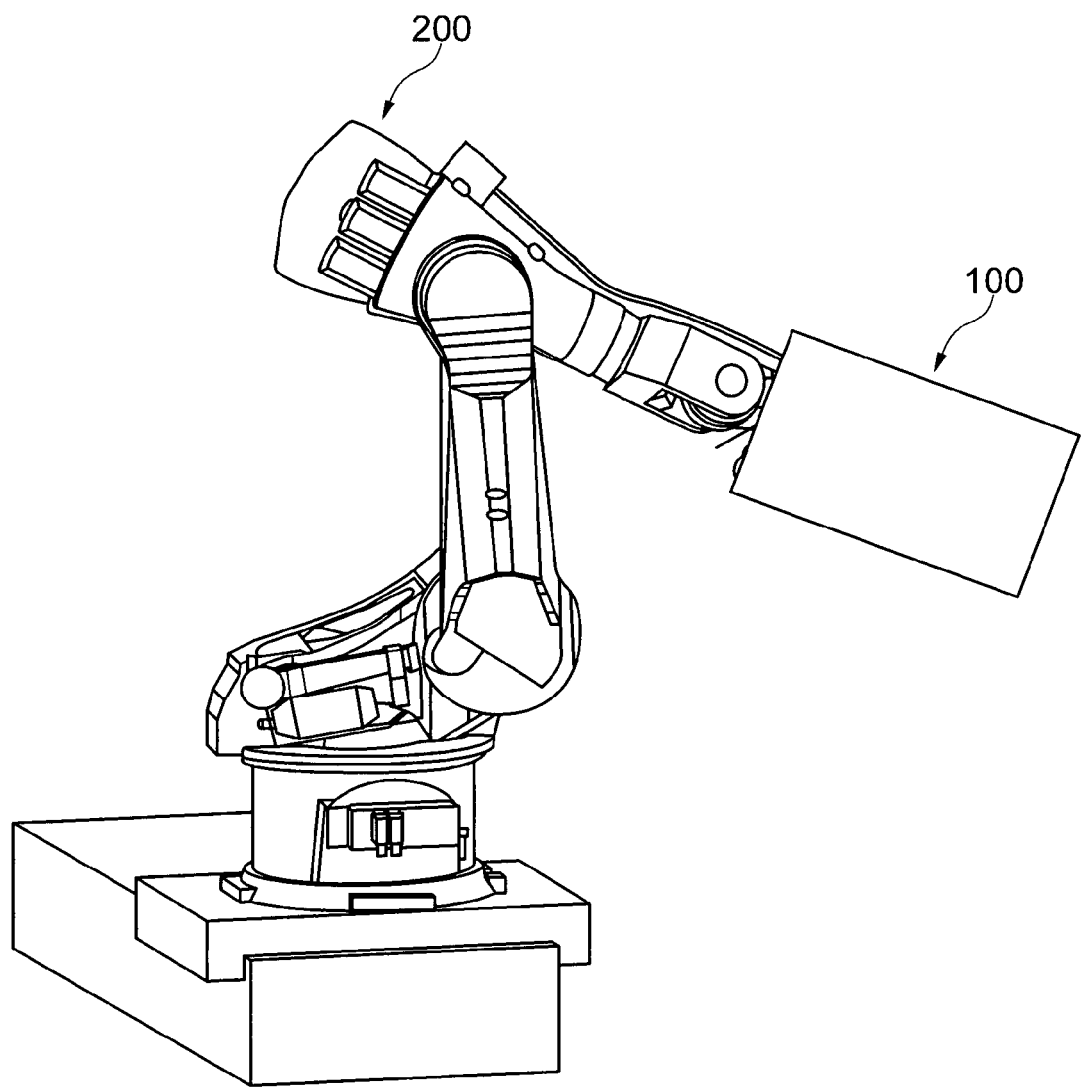
FIG. 6 shows schematically an industrial robot equipped with the effector of FIGS. 1a and 1 b.

In FIG. 6, for illustrative purposes, an industrial robot 200 is shown, that is equipped with the effector 100 (the effector 100 is only sketched). The skilled person will realize that the effector 100 can be part of a larger effector that may comprise additional installation means, such as drilling devices, measurement facilities, rivet installation tools etc.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE SIGNS

1 Gripping device
10 Housing
20, 21 Jaws
22 V-shaped gripping surface
23 Stop member
24 Straight gripping surface
25 Center
30, 31 Lever arm
32, 33 Free end of lever arm
34, 35 Pivot axis of lever arm
36, 37 Actuating projection of lever arm
38, 39 Pivot pin of lever arm
40 Holder
41 Return springs
42 Tooth wheel
45, 46 Drive wheels
50 Actuating piston
51 Piston pin
53 Bearing
60 Cover
61 Sealing ring
62 Pneumatic connector
80, 81, 82 Rivets
100 Robot effector
101 Frame
102, 103, 104 Feed lines
105 Fixing plate of frame
106 Controllers
110 Feeder mechanism
111, 112, 113 Outlets of feeder mechanism
120 Axis of rotation of gripping device
121 Slide for linear movement of gripping device
130 Supply station for additives
131 Supply line for additives
200 Industrial robot

What is claimed is:

1. A robot end effector for installing mechanical fasteners, the robot end effector comprising:
    a frame;
    a gripping device supported on the frame, the gripping device comprising:
        a housing, and
        a pair of jaws arranged on a holder, the pair of jaws adapted to grip a mechanical fastener therebetween, wherein the holder is arranged rotatable inside of the housing and wherein the jaws are shaped to facilitate a self-centering of a gripped mechanical fastener, wherein each jaw is pivotally arranged on a free end of a respective lever arm, and wherein the respective lever arms are pivotally supported by the holder; and
    a feeder mechanism supported on the frame for feeding mechanical fasteners, to the gripping device;
    wherein the gripping device is rotatably movable on the frame between a first position where the gripping device grips a mechanical fastener from the feeder mechanism, and a second position where the gripping device provides a gripped mechanical fastener to an installation mechanism.

2. The gripping device of claim 1, wherein at least one of the jaws has a concave gripping surface that facilitates the self-centering.

3. The gripping device of claim 2, wherein the concave gripping surface comprises one of a V-shaped or U-shaped gripping surface.

4. The gripping device of the claim 1, wherein the respective lever arms are supported such that during a pivoting movement of the lever arms, the free ends of the lever arms move toward or away from each other.

5. The gripping device of claim 1, wherein pivot axes of the two lever arms are parallel.

6. The gripping device of claim 5, wherein the pivot axes of the two lever arms are not identical and define a plane that is perpendicular to an axis of rotation of the holder.

7. The gripping device of claim 1, further comprising an actuating piston that actuates the lever arms.

8. The gripping device of claim 7, wherein:
    at least one of the lever arms comprises an actuating projection that is offset from the pivot axis of the lever arm;
    the actuating piston is linearly movable inside the holder and is adapted to interact with the actuating projection; and
    the actuating piston is arranged such that it rotates with the holder.

9. The gripping device of claim 1, wherein the jaws are actuated pneumatically.

10. The gripping device of claim 1, wherein the holder has a cylindrical hollow shape.

11. The robot end effector of claim 1, wherein the gripping device is linearly movable on the frame.

12. A robot comprising a robot end effector in accordance with claim 1.

* * * * *